United States Patent [19]

Park

[11] Patent Number: 4,893,691

[45] Date of Patent: Jan. 16, 1990

[54] AUTOMATIC BRAKING SYSTEM FOR A VEHICLE

[76] Inventor: Jong S. Park, 282-4, Sangil-dong, Kangdong-ku, Seoul, Rep. of Korea

[21] Appl. No.: 155,576

[22] Filed: Feb. 12, 1988

[51] Int. Cl.⁴ .................................................. B60T 7/12
[52] U.S. Cl. ..................................... 180/169; 188/353; 192/4 A; 192/4 C
[58] Field of Search ................ 180/167, 169; 188/353; 192/4 A, 4 C

[56] References Cited

U.S. PATENT DOCUMENTS

| | | | |
|---|---|---|---|
| 3,645,352 | 2/1972 | Stark et al. | 188/353 X |
| 3,795,426 | 3/1974 | Sisson | 180/169 X |
| 3,892,483 | 7/1975 | Saufferer | 180/169 X |
| 3,972,382 | 8/1976 | Takayama et al. | 180/169 |
| 4,407,388 | 10/1983 | Steel | 180/169 X |
| 4,446,950 | 5/1984 | Wise et al. | 188/353 X |
| 4,590,406 | 5/1986 | Ha | 315/80 |

Primary Examiner—Charles A. Marmor
Assistant Examiner—Tamara L. Finlay
Attorney, Agent, or Firm—Birch, Stewart, Kolasch & Birch

[57] ABSTRACT

An automatic braking system for a vehicle having a multichambered brake unit includes a control unit movement of the vehicle or obstacles behind the vehicle. This control unit is interconnected with a three-directional electromagnetic valve for controlling pressures within the various chambers of the brake unit. The system can prevent unwanted rearward movement of a vehicle when it is has been stopped on a slope or flat surface and is restarted. Further, obstacles behind the vehicle can be sensed when the vehicle is in reverse and a warning may be provided to the driver. If the vehicle continues to approach the obstacles, the braking system can stop the movement of the vehicle before an accident can occur.

7 Claims, 4 Drawing Sheets

AUTOMATIC BRAKING SYSTEM FOR A VEHICLE

FIELD OF THE INVENTION

This invention relates to an automatic braking system for a vehicle, and more particularly to an improved power brake unit having multichambers, the internal pressure of which is controlled by a control unit having sensors which sense the forward or backward movement of the vehicle when the immobile vehicle restarts on a slope or incline and sense the presence of an obstacle in the rear of the vehicle when the vehicle moves backward, so the master cylinder is operated automatically by the internal pressure differences between the chambers.

BACKGROUND OF THE INVENTION

Generally, when a vehicle having a manual transmission is driven in an ordinary manner, the brake pedal and clutch pedal must be depressed to stop the vehicle. When the driver wants to restart the vehicle after stopping, he or she must release the brake pedal and press the accelerator pedal and at the same time slowly release the clutch pedal.

When the vehicle is restarted on an up-slope after stopping, the driver selects a low-gear and releases the brake pedal, at the same time presses the accelerator and releases the clutch pedal to start the vehicle. Here, if the clutch pedal is released too quickly, the engine will stall. On the other hand, if the clutch is released too slowly, the vehicle will slip backward which may cause it to crash into a vehicle or other object behind it. Therefore, great technical skill is required to restart a vehicle stopped on a slope.

Moreover, a driver may operate a conventional braking system to park the vehicle on a slope, but if the braking force is not sufficient to maintain the vehicle in the parked position, the vehicle will roll downward. Therefore, unexpected accidents occur often.

Also, when a vehicle is driven backward, i.e., a vehicle is going in reverse, the driver cannot completely survey the area behind the vehicle using the rear view mirror and may be unaware that there is an obstacle (like a child) behind the vehicle. This may frequently result in many accidents.

An Automatic Brake Control System" for controlling a vehicle on a slope is shown in U.S. Pat. No. 4,590,406.

The system in accordance with the patent closes the brake fluid passage between the master cylinder and the brake cylinder, and this prevents the reverse flow of fluid in the brake fluid passage. Therefore, the brake force is maintained during any parking conditions after a vehicle must be stopped by the driver.

As a system disclosed in this patent is merely a locking mechanism, the operation of this system has many disadvantages. For instance, this system maintains the braking force when the clutch is engaged.

As the oil passage is either ON or OFF by the use of two valves, one of which has an aperture which has a diameter smaller than that of the oil passage, a time-delay is required for releasing the braking force.

On the other hand, when repeated instantaneous braking operations are required for the vehicle, repeated operation of the brake and clutch pedal is necessary. In such a situation, the driving cannot be smooth.

In addition, the parts of this prior art system require high precision and high production costs.

Another prior art disclosure involves an apparatus which uses pressurized air and a protect system. This apparatus is designed to operate the braking mechanism or absorb the shock when the vehicle crashes; however, this apparatus cannot prevent accidents in advance. This prior art apparatus decreases the damage after a collision.

SUMMARY OF THE INVENTION

It is an object of the present invention to provide an automatic braking system which operates a power brake unit automatically and prevents accidents in advance when a vehicle stopped on a slope is restarted.

It is another object of the present invention to provide an automatic braking system including a control unit having two sensors which sense the presence of an obstacle behind the vehicle when it is being driven backward and which first warns the driver with a buzzer and then, if the obstacle is in the range of danger, the above braking system is promptly operated by sensors to stop the vehicle.

In accordance with the above objects of the present invention, there is provided a power brake unit comprising two brake cylinders which are interconnected with a vacuum pipe respectively. One of these cylinders is connected with the air suction port of the engine.

A three-directional electromagnetic valve is also provided at an intermediate portion of the vacuum pipe. The valve is connected to the control unit which is operated by the status of driving conditions such as the rotational direction of the wheel and the position of the gear shift lever and clutch pedal.

Accordingly, when a vehicle is stopped on a slope and is moved spontaneously in one direction, or if a vehicle is driven backward and approaches an obstacle behind it, the control unit generates a signal to operate the valve for changing the internal pressure of the power brake unit.

As a result, force is generated in the power brake unit which operates the master cylinder causing the vehicle to brake automatically.

In accordance with the present invention, the power brake unit is constructed with multichambers including diaphragms and plates which divide the unit into several chambers. Two of these chambers are in communication with the vacuum pipe, and a push rod is connected with the master cylinder and the valve rod is connected with the brake pedal respectively and extends across the chambers through the central portion of the plate.

The three-directional electromagnetic valve is connected with the control unit including the sensors which sense the rolling of the wheel.

When the sensors sense movement of the wheel in any direction, said control unit generates an electrical signal for operating the valve to communicate with the atmosphere or vacuum selectively, and then the internal pressure of each chamber of the brake cylinder is changed subsequently.

Therefore, in a general braking situation, if the driver intends to decrease the speed of the vehicle on a flat road or slope, the speed of the vehicle is controlled by depressing the brake pedal. But, when a vehicle is driven in any direction or restarted on a slope, the sensors of the control unit sense the rolling movement of the vehicle and generate a signal to control the three-directional electromagnetic valve which communicates with the atmosphere or vacuum pipe to create pressure differences between the chambers. When the vehicle is driven in an ordinary manner, the three-directional electromagnetic valve does not operate.

The brake power unit comprises double structures of a first power brake cylinder and a second power brake cylinder.

If the vehicle is driven on a flat road, it may be braked in the ordinary manner by the driver. A valve rod associated with the brake pedal will push the diaphragm and the plate in the brake cylinder, and subsequently, a pressure difference occurs to push a push rod connected with a master cylinder so as to stop the vehicle.

In the above description, if a vehicle stopped on a slope moves in any direction and if the sensors sense the movement of the wheels and send an electrical signal to the three-directional electromagnetic valve, that valve will then be in communication with the atmosphere or vacuum pipe. Therefore, internal pressures of the chambers (a first power brake cylinder and a second power brake cylinder) are changed. The pressure difference formed between the above chambers functions as an operational force to move the diaphragms toward the first brake cylinder because said force acts on the diaphragm by the plate attached to the diaphragm. This results in the diaphragms and plates being moved forwardly together.

With the above movement of the diaphragm and the plate, the push rod connected with the first plate is moved forward to operate the master cylinder. The vehicle is then automatically stopped by the operation of the master cylinder.

Another case, when a vehicle is driven backward and an obstacle is behind the vehicle, first, the sensor warns the driver with a buzzer, and if the obstacle comes in the range of danger, said power brake unit is operated automatically in the above described manner.

Accordingly, when a stopped vehicle is restarted on a slope or is parked on a flat surface, any backward movement of the vehicle is restrained automatically. Also, when a vehicle is driven backward and there is an obstacle behind it, the vehicle will stop and accidents can be prevented in advance with the aid of the sensor.

Further features and advantages will be apparent from the following detailed description of the system according to the invention with reference to the attached drawings set forth by way of example, but not limited to them. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
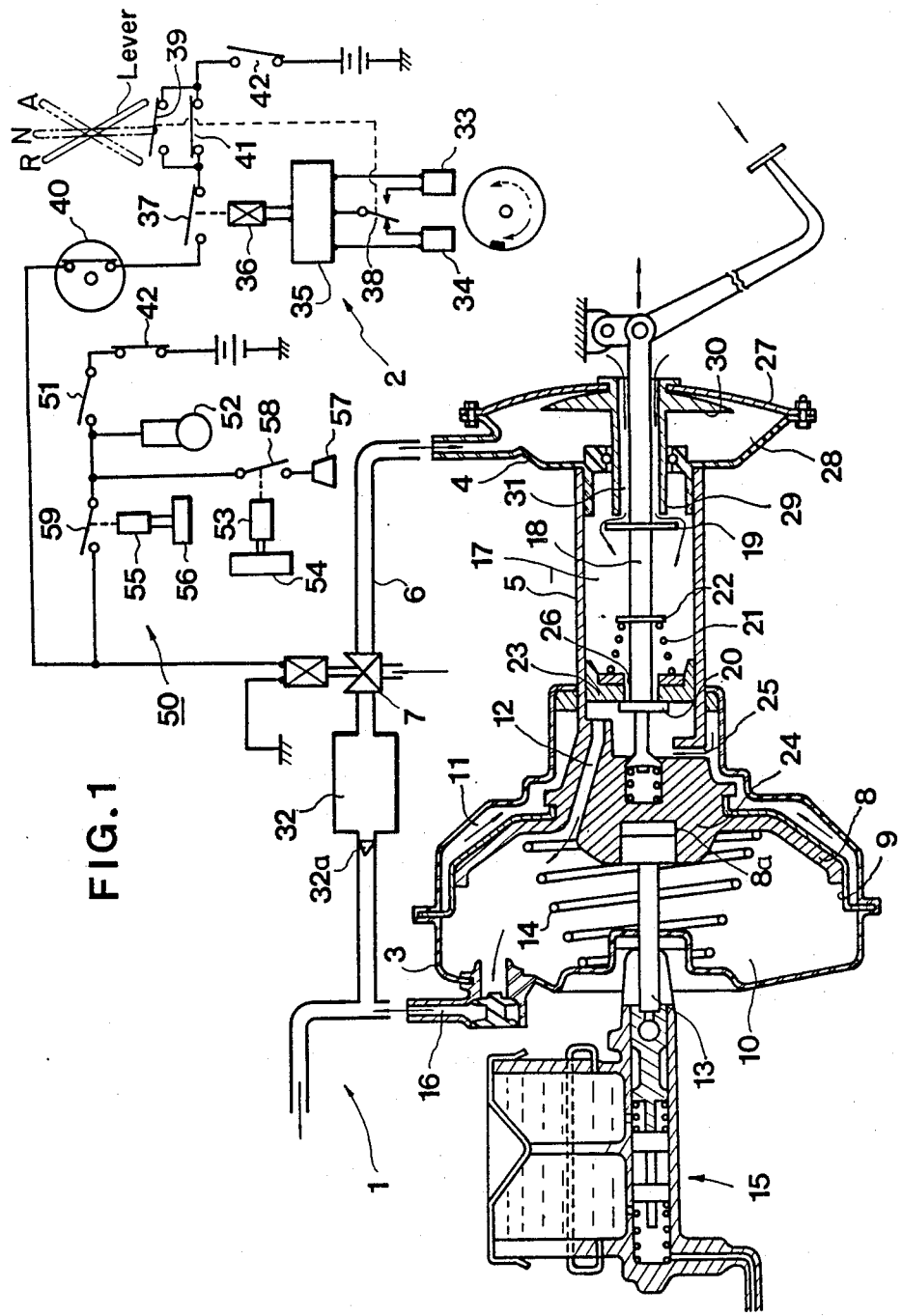
FIG. 1 is a cross-sectional view of an automatic braking system in accordance with the first embodiment of the present invention.
Figure 2:
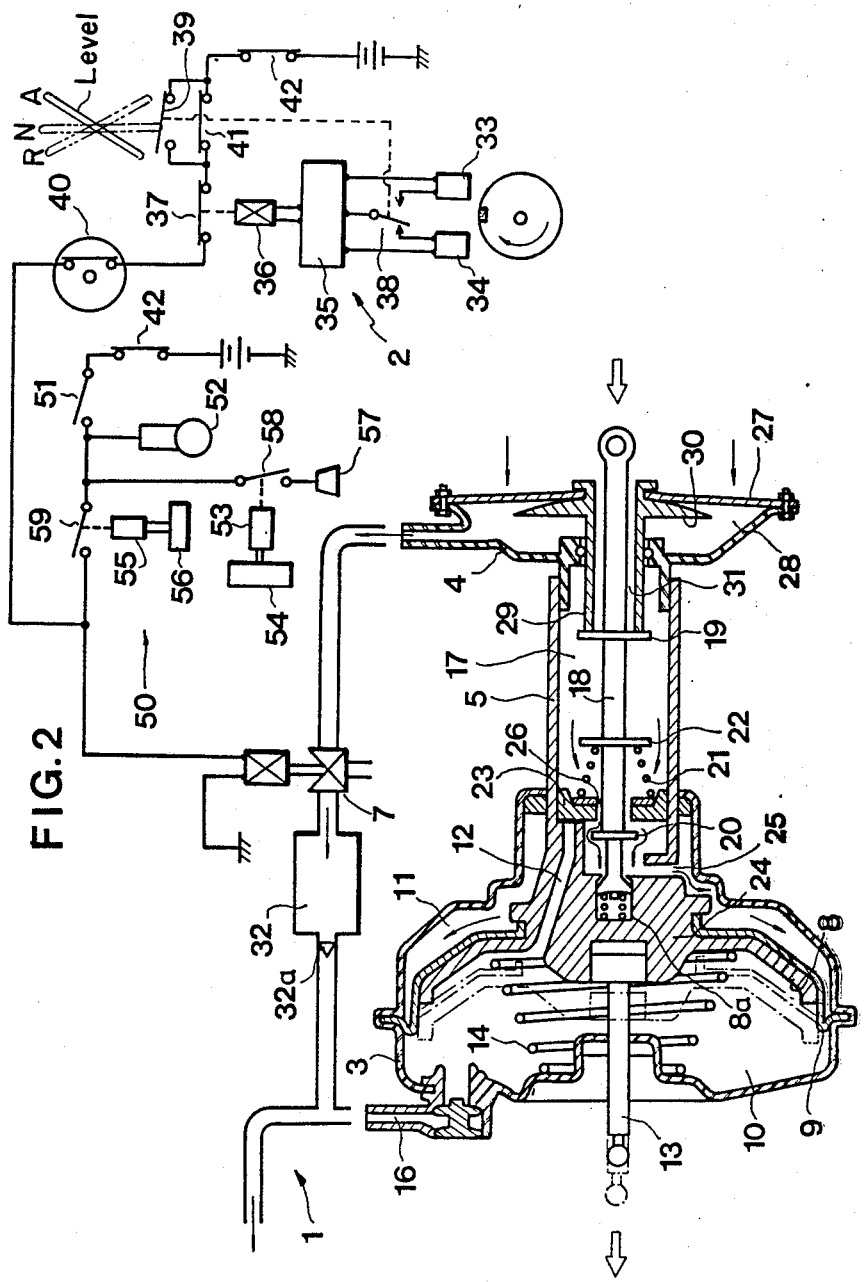
FIG. 2 is a cross-sectional view of the operational status of the braking system of FIG. 1.

FIG. 1 and FIG. 2 show a cross-sectional view of an embodiment of an automatic braking system in accordance with the present invention. This automatic braking system consists of a power brake unit 1 and a control unit 2.

The power brake unit 1 comprises a first power brake cylinder 3, a second power brake cylinder 4, and a valve cylinder 5. The valve cylinder 5 connects the first power brake cylinder 3 with the second power brake cylinder 4.

A vacuum pipe 6 connects the power brake cylinder 3 with the power brake cylinder 4. On an intermediate portion of the vacuum pipe 6, a three-directional electromagnetic valve 7 is provided which communicates with an air passage and vacuum pipe 6 and connected electrically with said control unit 2.

The first power brake cylinder 3 of the power brake unit 1 is comprised of a plate 8 which is integrally combined with the valve cylinder 5 and a diaphragm 9 which divides the cylinder 3 into two vacuum chambers 10 and 11. The two vacuum chambers 10 and 11 communicate through a hole 12 which is horizontally formed in the plate 8. A push rod 13 is inserted in a recess 8a formed at the intermediate portion of the plate 8 and biasing a spring 14 in the recess 8a.

The vacuum chambers 10 and 11 are divided by the diaphragm 9 and are maintained in a vacuum state by the engine. An air discharging hole 16 is formed in the corner portion of the vacuum chamber 10.

A cylindrical chamber 17 of the valve cylinder 5 houses a valve rod 18 including a plate 19. The valve cylinder 5 also houses an assistant valve 20, a spring 21, and a spring plate 22 supporting the spring 21.

A movable valve 23 is located between the outside of the valve rod 18 and the inside surface of the cylindrical chamber 17. The spring 21 elastically biases the movable valve 23 and is located between the movable valve 23 and the spring plate 22 of the valve rod 18.

A hole 25 is formed in a boss portion 24 of the plate 8 which connects the second vacuum chamber 11 of the power brake cylinder 3 with the cylindrical chamber 17.

A gap 26 is formed between the movable valve 23 and the valve rod to communicate the cylindrical chamber 17 of the valve cylinder 5 with the vacuum chambers 10 and 11 of the power brake cylinder 3.

The power brake cylinder 4 consists of a diaphragm 27 forming the vacuum chamber 28 and a cylindrical sleeve 29 including a plate 30 which moves in accordance with the movement of the diaphragm 27. One end of the valve rod 18 extends through the sleeve 29 and connects with the brake pedal of the vehicle. A gap 31 is formed between the valve rod 18 and the sleeve 29. The cylindrical chamber 17 is in communication with the atmosphere through the gap 31.

Vacuum pipe 6 has a vacuum tank 32 and a check valve 32a. The vacuum pipe 6 is connected with each brake cylinder 3 and 4, and on the intermediate portion of the vacuum pipe 6 there is provided the three-dimensional electromagnetic valve 7 which is connected with the control unit 2.

The control unit 2 consists of two sensors 33 and 34 which sense the rolling movement of the wheel, one of the sensors senses its forward revolution, the other senses its backward revolution. The two sensors 33 and 34 are connected with an electrical circuit 35 which is controlled by the electrical signal from the sensor.

The electrical circuit 35 comprises a relay 36 having a relay switch 37 and a selection switch 38. The selection switch 38 is set up between the electrical circuit 35 and the two sensors 33 and 34 and communicates with a gear shift lever switch 39.

By switching the gear shift lever switch 39 with the selection switch 38, the selection switch 38 is in contact with the sensor 33 when the gear shift lever is in reverse and with the sensor 34 when the gear shift lever is in a position other than reverse.

The sensor 34 senses the backward movement of the wheel and the sensor 33 senses the forward movement of the wheel. A velocity switch 40 is located between the relay switch 37 and the three-directional electromagnetic valve and is in communication with the valve 7 which is turned on only at speeds less than 4 kilometers per hour. The gear shift lever switch 39 is turned on only when the gear shift lever is in the neutral position. A clutch siwtch 41 is turned on only when the driver depresses the clutch pedal. The gear shift lever switch 39 and clutch switch 41 comprises a parallel circuit between the relay switch 37 an the main switch 42.

Also, another control unit 50 which is parallel to the control unit 2 is connected to the valve 7.

The control unit 50 comprises a gear shift lever switch 51 which is turned on simultaneously with a lamp 52 only when the gear shift lever is in reverse, a relay 53 which is operated by a long range sensor 54 and a relay 55 which is operated by a short range sensor 56.

According to the operation of the relay 53, a buzzer 57 which is connected with the relay 53 is operated by a relay switch 58. According to the operation of the relay 55 a relay switch 59 operates such as when switch 58 is turned off.

When a vehicle is moved up a slope, one of the clutch switch 41 and the lever switch 39 should be turned on from the main switch 42. The relay switch 37 is turned on by operation of the relay 36 of the electric circuit 35 at the same time, and the velocity switch 40 is turned on when the vehicle is moved slowly. The power brake unit is then operated as set forth in the above description.

When a vehicle is driven backward, the lamp 52 is turned on. At this time, the gear shift lever is in reverse and if an obstacle comes within a given range, the buzzer 57 is operated by the long range sensor 54 to warn the driver.

Furthermore, if an obstacle comes closer to the vehicle within another given range, said valve 7 is operated by the short range sensor 56 so that the vehicle is stopped promptly by way of the operation of the power brake unit as set forth in the above description.

Figure 3:
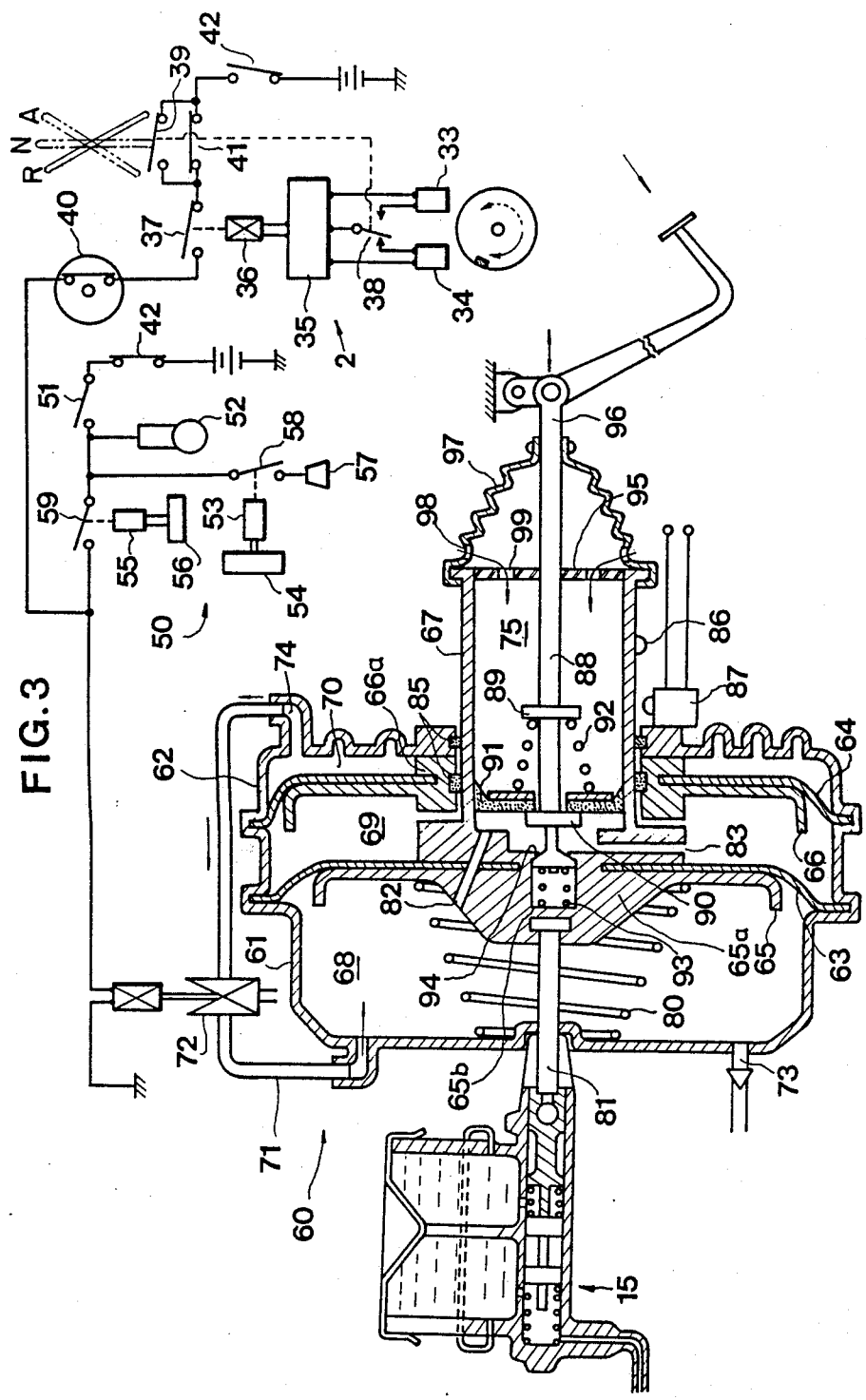
FIG. 3 is a cross-sectional view of another embodiment of the automatic braking system of the present invention.
Figure 4:
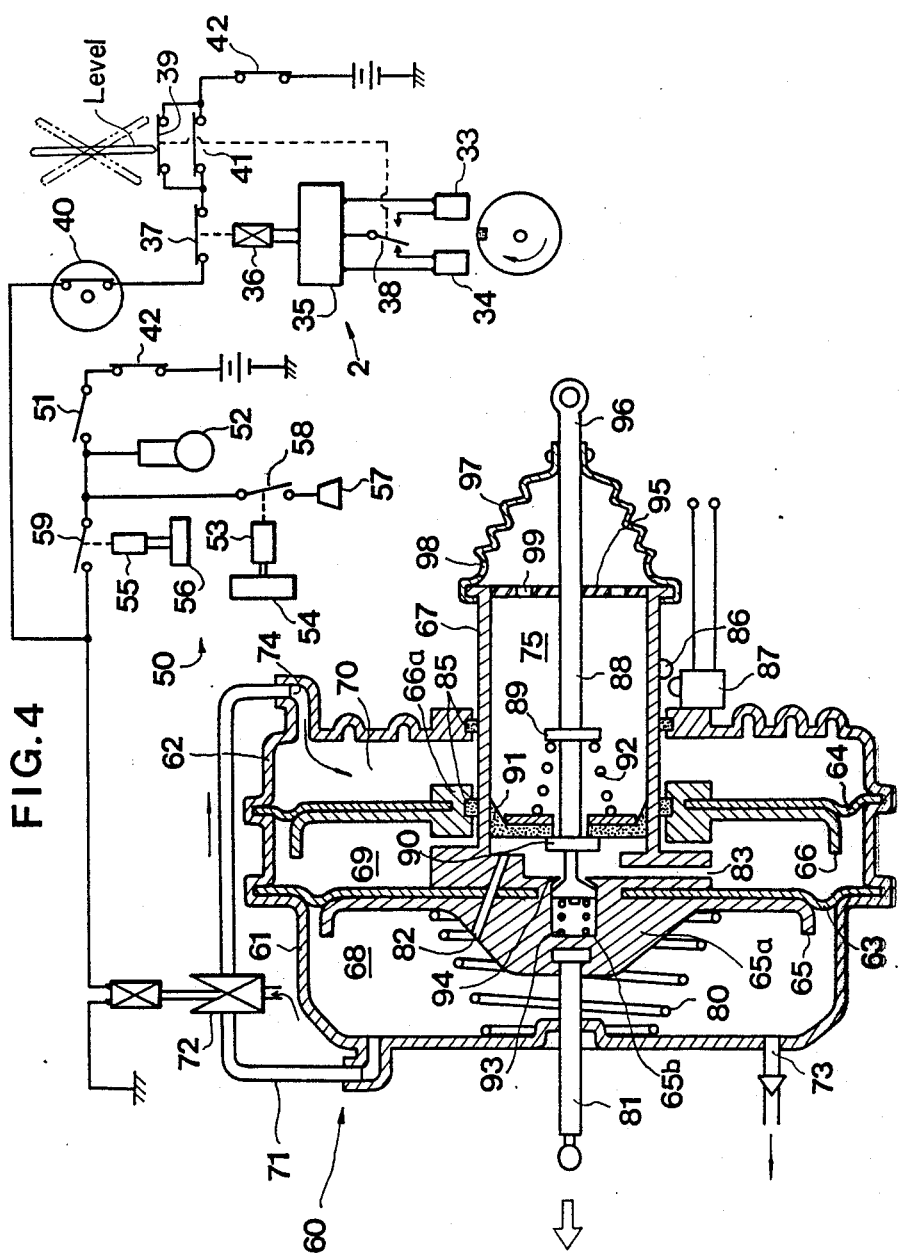
FIG. 4 is a cross-sectional view of the operational status of the braking system of FIG. 3.

FIG. 3 and FIG. 4 show a cross-sectional view of another embodiment of an automatic braking system in accordance with the present invention. According to this embodiment, there is no vacuum tank 32 as in the first embodiment.

A power brake unit 60 of the braking system in accordance with this second embodiment comprises a first and a second power brake cylinder 61 and 62 having diaphragms 63 and 64 on which plates 65 and 66 are respectively attached and a valve cylinder 67 extended through the second power brake cylinder 62.

The inner spaces of said brake cylinders 61 and 62 are divided into three vacuum chambers 68, 69 and 70, and the two chambers 68 and 70 are connected with a vacuum pipe 71. A three-directional electromagnetic valve 72 is mounted on the intermediate portion of the pipe 71.

The first brake cylinder 61 is connected with the suction port of the engine through an air discharging hole 73 in order to make the above first and second chambers 68 and 69 formed in the first power brake cylinder 61 and said third chamber 70 formed in the second power brake cylinder 62 at a vacuum state.

The third chamber 70 is connected by a hole 74 with the vacuum pipe 71 from the three-directional electromagnetic valve 72.

The power brake cylinders 61 and 62 consist of diaphragms 63 and 64 including plates 65 and 66. The valve cylinder 57 is integrally formed at the center portion of the plate 66 and extends horizontally therefrom.

The intermediate portion of the plate 65 is biased by a spring 80 in the first cylinder 61 and has one end of a push rod 81 for operating the master cylinder. This one end of push rod 81 is connected to the plate 65.

A boss portion 65a of the plate 65 has holes 82 and 83 which communicate the cylindrical chamber 75 of the valve cylinder 67 with the first and second chambers 68 and 69, respectively.

A hole 74 is provided in the second power cylinder 62 to communicate the third chamber 70 with the first chamber 68 through the vacuum pipe 71 and to maintain a vacuum state in the third chamber 70. The third chamber 70 is not communicated with the second chamber 69.

The valve cylinder 67 is integrally formed with the first plate 65 attached to the first diaphragm 63 which divides a first chamber 68 from a second chamber 69. On the inner surface of the second plate 66, a ring 85 is provided which air tightly seals the second plate 66 and the valve cylinder 67 when said valve cylinder 67 is sliding in accordance with the movement of said first diaphragm 63.

In addition, a protrusion 86 is provided at the outer surface of the valve cylinder 67, as well as a microswitch 87. This microswitch 87 is operated by contacting the protrusion 86 which is secured to an outside of the second power brake cylinder 62.

A valve rod 88 which has a spring plate 89 and a subvalve 90 extends longitudinally through the cylindrical chamber 75. A movable valve 91 is biased by a spring 92 which extends between the plate 89 and the movable valve 91. The movable valve 91 is provided on the internal surface of the cylindrical chamber 75 and slides therealong.

Additionally, one end of said valve rod 88 is elastically biased by the spring 93. This end of valve rod 88 is inserted into the recess 65b of the first plate 65 and is secured with a pin 94. Another end of the valve rod 88 is supported by the supporting member 95 of the cylindrical chamber 75.

An extension portion 96 of the valve rod 88 which protrudes from the cylindrical chamber 75 is connected with the brake pedal. A bellows 97 is mounted on the valve cylinder 67 and said extension portion 96 of the valve rod 88. A plurality of bores 98 and 99 are formed on the bellows 97 and the supporting member 95 respectively, so that the cylindrical chamber 75 communicates with the atmosphere. Thus, the cylindrical chamber 75 is always maintained at atmospheric pressure.

Meanwhile, a control unit 2 similar to the control unit 2 for the first embodiment of the present invention senses the movement of the wheels and is connected with the three-directional electromagnetic valve 72.

The valve 72 is operated to change the internal pressure of the third vacuum chamber 70 into a vacuum state by the sensing operation of said control units 2 and 50 in a nondriven condition, but the detail is omitted because it is the same as the description of the operation in the first embodiment of this invention.

OPERATION

The operation of the present invention described above will now be described in accordance with the accompanying drawings.

When a vehicle is rolling backward because the driver has lost control of the vehicle or brake force is lacking, or when the vehicle is stopped on a slope or is restarted after being stopped on a slope will now be considered.

In the first embodiment of this invention as illustrated in FIG. 1 and FIG. 2, the backward moving sensor 34 senses backward rolling movement of the vehicle and generates a signal which operates the relay 36 to connect the relay switch 37.

As the gear lever switch 39 or the clutch switch 41 is connected selectively according to the relation between the gear lever and the clutch, one of the switches 39 and 41 is always to be connected.

Meanwhile, a speed switch 40 is to be turned on only when the vehicle is driven slowly, such as under the speed of 4 Km/h. Thus, when the vehicle begins to move slowly backward after being stopped, an electrical signal is generated from the electrical power source and is sent through the main switch 42 to the gear lever switch 39 or the clutch switch 41.

Therefore, when the three-directional electromagnetic valve 7 is operated to switch the direction by the electrical signal, both the vacuum pipe 6 and the third chamber 28 of the second power brake cylinder 4 are interconnected to the vacuum tank 32 or vacuum chamber 10 so that the chamber 11 of the second power brake cylinder can achieve a vacuum.

According to the above operation, the internal pressure of the chamber 28 is decreased.

The second diaphragm 27 is moved forward with plate 30 by the above pressure difference, between the internal pressure of the chamber 28 and the outside of it. The sleeve 29 of the plate 30 is pushed into the inside of the valve cylinder 5 and finally, the free end of the sleeve 29 pushes the contacting plate 19 of the valve rod 18, so that the valve rod 18 is moved forward.

The valve rod 18 continues to move due to the pressure differences between the second vacuum chamber 11 and the cylindrical chamber 17. The movable valve 23 is also moved by the spring 21 until it closes the hole 12 of the first plate 8.

After the movable valve 23 has closed the hole 12, the valve rod 18 is moved alone. The assist valve 20 is disconnected from the movable valve 23 so that the atmosphere of the cylindrical chamber 17 of the valve cylinder 5 flows into the gap 26 between the valve rod 18 and the moving valve 23 and a hole 25 in the boss portion 24 of the plate 8. Finally, the second chamber 28 is maintained at atmospheric pressure.

Because the first chamber 10 has been maintained as a vacuum by the pressure difference between the first chamber 10 and the second chamber 11, the diaphragm 9 and the plate 8 are moved toward the first chamber 10. The plate 8 pushes the push rod 12 and finally, a master cylinder 15 which is secured to one end of the push rod 13 is operated to brake the vehicle. As a result, the braking operation described above obtains the same effect as if the driver depressed the brake pedal directly to stop the vehicle in a conventional manner.

On the other hand, in order to reverse the braking operation described above, the driver merely operates a clutch. If the clutch switch 41 is disconnected, the three-directional electromagnetic valve 7 is switch so that the third chamber 28 is filled with air, and then the first diaphragm 9 and the plate 8 are reversed by the force of the spring 14 in the first power brake cylinder 3 to return to an original position, so that the braking force is released.

Referring now to FIG. 3 and FIG. 4 wherein another embodiment of this invention is shown, the operation of the second embodiment will now be described.

At first, three chambers 68, 69 and 70 are maintained at atmospheric pressure, and the three-directional electromagnetic valve 72 is connected to chambers 69, 70 by means of the pipe 71 as in the first embodiment.

If the above valve 72 is in communication with the atmosphere by the input signal frm the control unit 2 designed to sense the movement of the wheel, the atmosphere will flow into a third chamber 70 through the valve 72. As the second chamber 69 is in a vacuum state, a pressure difference appears between the second chamber 69 and the third chamber 70 so that the second diaphragm 34 with the plate 66 are moved toward a second chamber 69. Here, the boss portion 66a of the plate 66 pushes the boss portion 65a of the first plate 65 attached on the first diaphragm 63 and then the plate 65 is moved toward the first chamber 68 against the elastic force of the spring 80 so that the push-rod 81 connected to the plate 65 at one end of it and the master cylinder 15 at the other end thereof are pushed toward the master cylinder 15 to generate the oil pressure in the master cylinder.

The oil pressure prevents the vehicle from moving or slipping on the rolling slide surface.

When the plate 65 is moved toward the first chamber 68, since the end of the valve rod 88 is secured in the recess 65b formed on the boss portion 65a of the plate 65 by the pin 94, the valve rod 88 then pulls the brake pedal. As a result, the vehicle is stopped in the same manner as when the driver pushes the brake pedal.

On the other hand, when the driver intends to stop the vehicle by pushing the brake pedal, the valve rod 88 connected with the brake pedal is moved against the elastic force of the spring in the recess 65b and the movable valve 91 is also moved along the inner surface of the valve cylinder 67 until the movable valve 91 closes the hole 82 formed on the boss portion 65a of the plate 65. Therefore, the movable valve 91 cannot move any more, but only a valve rod 88 continues to move forward and the assisting valve 90 is disengaged from the movable valve 91.

Accordingly, the interior of the cylindrical chamber 75 which is maintained at atmospheric pressure through the bores 98 and 99 formed on the bellows 97 and the supporting member 95 is connected to a second chamber 69 through the hole 83 formed on the boss portion 65a of the plate 65. Accordingly, the second chamber 69 is maintained at atmospheric pressure, and the first diaphragm 63 and the plate 65 are pushed forward by the pressure difference between the chambers 68 and 69. Finally, the push rod 81 is moved forward to operate the master cylinder 15.

According to the above description, the braking operation can be obtained under sequential procedures, so that the braking force is a linear operation which can be smoothly accomplished.

If the whole length of the valve cylinder 67 is inserted into the power brake cylinders 61 and 62 because of a lack of fluid in the master cylinder 15, the protrusion 86 attached to the valve cylinder 67 comes into contact with the microswitch 87 which is connected to the valve 72.

Therefore, the three-directional electromagnetic valve 72 is switched to the atmosphere and enables the third chamber 70 of the second power brake cylinder 62 to be maintained in an atmospheric state. The push rod 81 is returned to the first state by the elastic force of the spring 80 in the first power brake cylinder 61.

Next, under the condition of continuation of the immobile status as set forth above, the three-directional electromagnetic valve 72 is switched again into the vacuum state and pushes the push rod 81 for supplying an additional braking force.

In both the first and second embodiments of this invention described above, if there is an obstacle behind the vehicle as it is moving backward, a long range sensor 54 will first sense the presence of the obstacle and will warn the driver with a buzzer 57. If the vehicle continues to approach the obstacle, just before collision, the short rage sensor 56 is operated to connect the relay 55 and the switches 59 to generate an electrical signal which is sent to the three-directional electromagnetic valve 72 to be operational for braking in a manner as described above. The vehicle is therefore promptly stopped.

Many modifications may be made within the scope of the inventive concept of this invention. For example, by connecting the chamber with the atmosphere or a vacuum in both embodiments of this invention, diaphragms and plates are moved by the pressure difference which is built up between the atmosphere and vacuum. The same result may be obtained by using pressurized air instead of the atmosphere as described above.

Also, the present invention is applicable to vehicles having automatic transmission. In this case, by operating the clutch switch by the accelerator pedal instead of the clutch pedal, the three-directional electromagnetic valve can be operated to release the braking operation if a driver adjusts the gear selection lever to a forward or backward position and depresses the brake pedal.

Because many modifications may be made in the embodiments disclosed herein, it is to be understood that the details herein are to be interpreted as illustrative and not in a limiting sense. Such variations are not to be regarded as a departure from the spirit and scope of the invention, and all such modifications as would be obvious to one skilled in the art are intended to be included within the scope of the following claims.

I claim:

1. An automatic braking system for a vehicle comprising:
   a brake pedal;
   a master cylinder;
   a first power brake cylinder having a first diaphragm and a plate which is provided with a valve rod connected to the brake pedal and a push rod connected to the master cylinder;
   a valve cylinder axially extending generally perpendicular to the plate;
   a second power brake cylinder;
   a vacuum pipe connecting said first power brake cylinder to said second power brake cylinder;
   a three-directional electromagnetic valve positioned in said vacuum pipe, said three-directional electromagnetic valve being movable to switch said vacuum pipe between atmosphere or vacuum; and
   control means connected electrically with said three-directional electromagnetic valve for sensing one of forward and backward movement of the vehicle.

2. The automatic braking system for a vehicle according to claim 1, wherein the second power brake cylinder is positioned at a rear end of the valve cylinder apart from the first power brake cylinder.

3. The automatic braking system for a vehicle according to claim 1, wherein the second power brake cylinder is integrally combined with the first power brake cylinder.

4. The automatic braking system for a vehicle according to claim 1, wherein the vacuum pipe further comprises a vacuum tank having a check valve.

5. The automatic braking system for a vehicle according to claim 1, wherein the control means further comprises a forward sensor for sensing forward movement and a backward sensor for sensing backward movement of a wheel of the vehicle.

6. The automatic braking system for a vehicle according to claim 5, wherein the vehicle includes at least a gear lever and wherein forward and backward sensors are switched in response to the position of the gear lever.

7. The automatic braking system for a vehicle according to claim 5, wherein the control means further comprises a long range sensor and a short range sensor both of said range sensors sensing an obstacle located behind the vehicle and being operative in response to the position of the gear lever.

* * * * *